(12) United States Patent
Shahid

(10) Patent No.: US 6,185,348 B1
(45) Date of Patent: Feb. 6, 2001

(54) APPARATUS AND METHOD FOR MANUFACTURING A MULTIFIBER INTERCONNECTION CIRCUIT

(75) Inventor: Muhammed Afzal Shahid, Snellville, GA (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/234,024

(22) Filed: Jan. 19, 1999

(51) Int. Cl.$^7$ ...................................................... G02B 6/30
(52) U.S. Cl. ................................. 385/49; 385/65; 385/83; 385/130; 385/137
(58) Field of Search .................................. 385/49, 65, 83, 385/89, 128, 130, 135, 137, 147

(56) References Cited

U.S. PATENT DOCUMENTS 5,732,173 * 3/1998 Bylander et al. ....................... 385/49

* cited by examiner

*Primary Examiner*—Phan T. H. Palmer

(57) ABSTRACT

The present invention is an apparatus and method for assembling a multifiber interconnection circuit where the circuit includes at least one elongated member disposed between a first cover member and a second cover member. The apparatus includes a template, a receiving member, and a transfer member. The template has a first end and a second end and a means for routing an elongated member, such as an optical fiber, from the first end of the template to the second end of the template. The receiving member is arranged and configured to receive the optical fiber engaged by the template. The transfer member is configured to support the receiving member for reception of the optical fiber. In a preferred embodiment of the invention, an alignment guide aligns and orients the template with the transfer member. The present invention can also be viewed as a method for assembling a multifiber interconnection circuit by passing a fiber from the template in the configuration of the passage disposed therein onto a receiving member where the fiber can become fixed.

23 Claims, 7 Drawing Sheets

APPARATUS AND METHOD FOR MANUFACTURING A MULTIFIBER INTERCONNECTION CIRCUIT

FIELD OF THE INVENTION

The present invention relates generally to the field of routing optical signals and more specifically to an apparatus and method for manufacturing a multifiber interconnection circuit.

DISCUSSION OF RELATED ART

Multifiber interconnection circuits are widely known and used in the field of optical fibers. A commonly known flexible optical fiber interconnection circuit includes a configuration of optical fibers sandwiched between a pair of flexible plastic sheets, such as Kapton, or a printed circuit board (PCB). Typically, at opposing edges of the pair of sheets are the circuit's connection points for input and output. Generally, these circuits are connected at one end to another device for input, such as a laser array or another connector. The optical interconnection circuit reorganizes the light signals in a predetermined manner as it transports them across to the opposing end, typically connected to another connector or light transferring device. The input fibers and the output fibers can be either fusion spliced or mechanically spliced to the devices between which the interconnection circuit is to communicate. These interconnection circuits can take the shape of either a cross-connection circuit or a fan-out circuit.

In a typical cross-connection circuit, several separate groups of fibers are provided with input signals. Internal to the circuit, the groups of fibers can be separated and arranged to form new groupings, consisting of fibers from different input groups, to form output groups. This arrangement results in a reconfiguration of the fibers and, therefore, a reconfiguration of the light signal that was received by the interconnection circuit. The input groups can be made with ribbonized fibers or individual fibers. Ribbonized fibers are essentially groups of separate fibers bonded together with a matrix material, thus appearing as a single structure. Where ribbonized fibers are used to provide the input for the cross-connection circuit, the fibers are separated within the structure of the circuit, reconfigured, and re-ribbonized into output groups. When individual fibers are used in the input groups, the individual fibers are separated from their input groups within the structure of the circuit and arranged to form new groups of fibers for output. These output groups can be ribbonized using ribbon connectors or another method of bonding fibers together at the output groups.

In a simple fan-out interconnection circuit, one group of fibers provides an input signal into the circuit, generally, as received from another device. The fibers are arranged in the circuit such as to separate the group, therefore separating the signal and providing multiple outputs. Similar to the cross-connection circuit, the fan-out circuit can be made using ribbonized fibers or individual fibers for the input.

Traditionally, such interconnection circuits have been manufactured by dedicated machinery or by hand. Production by dedicated machinery requires high initial investment costs while hand production is difficult to duplicate in high volume. Both production processes are costly and require the use of highly skilled labor.

SUMMARY OF THE INVENTION

The present invention is an apparatus and method for assembling a multifiber interconnection circuit where the multifiber interconnection circuit includes at least one optical fiber disposed between a first cover member and a second cover member. Briefly described, in architecture, the apparatus essentially comprises a template, a receiving member, and a transfer member. The template has a first end and a second end and a means for engaging and routing an elongated member, such as an optical fiber, from the first end of the template to the second end of the template. The receiving member forms the first cover member of the interconnection circuit and is arranged and configured to receive the optical fiber engaged by the template. The transfer member includes a support surface configured to support the receiving member for reception of the optical fiber. The invention may also include an alignment guide to align and orient the template with the transfer member for accurate transfer of the optical fiber from the template to the receiving member.

The present invention can also be viewed as a method for assembling a multifiber interconnection circuit. The method essentially comprises the steps of providing at least one passage of a predetermined configuration in a template and arranging an elongated member, such as an optical fiber, in the passage. A receiving member is positioned on a transfer plate and the optical fiber can be transferred from the template to the receiving member by placing the template adjacent the transfer plate such that the receiving member and optical fiber are disposed therebetween.

The invention can be better understood from the following detailed description read in conjunction with the following drawings. The components in the drawings are not necessarily to scale, emphasis instead being placed upon clearly illustrating the principles and features of the present invention. Moreover, in the drawings, like reference numerals designate corresponding parts throughout the several views.

DETAILED DESCRIPTION OF THE INVENTION

Figure 1:
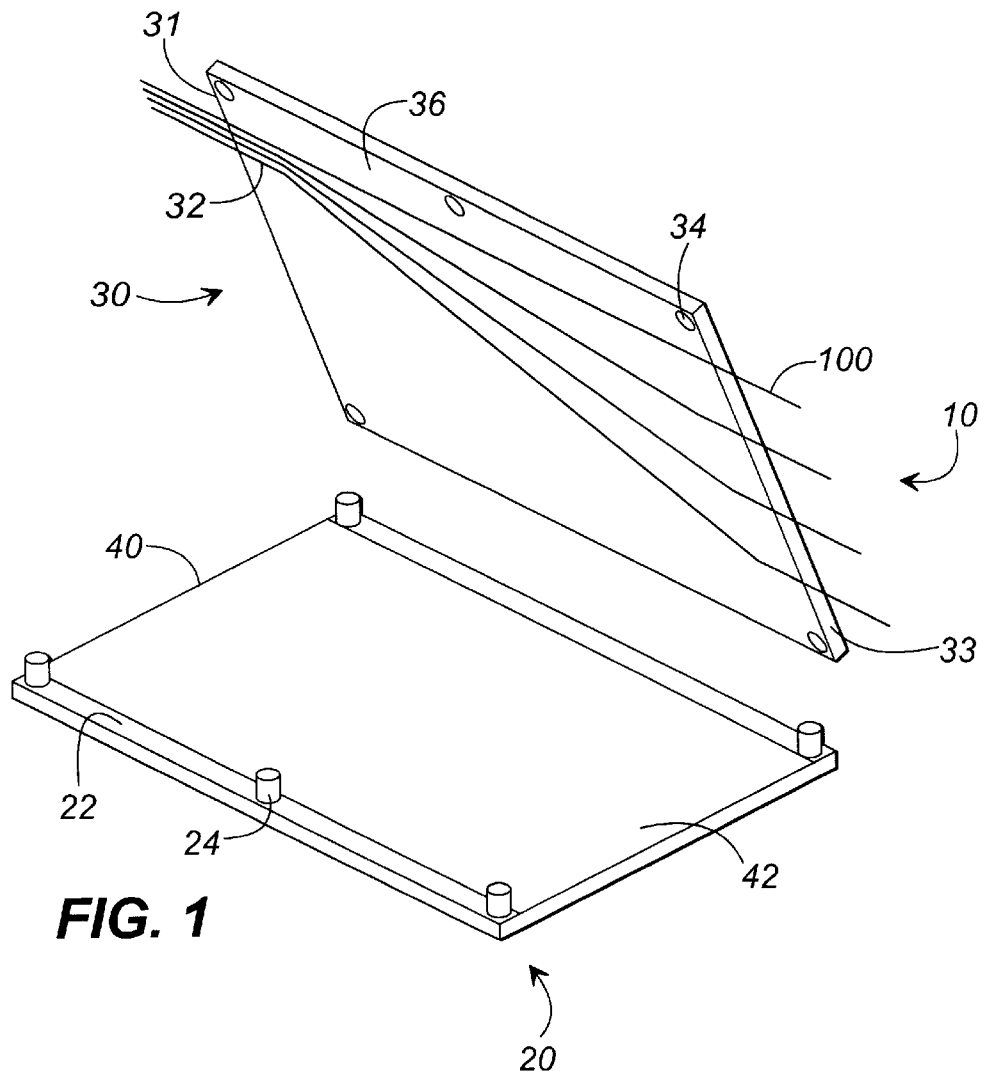
FIG. 1 is a perspective view of the apparatus for assembling a multifiber interconnection circuit before transferring a fiber.

While the invention is susceptible to various modifications and alternative forms, a preferred embodiment thereof is shown by way of example in the drawings and will herein be described in detail. It should be understood, however, that there is no intent to limit the invention to the particular form disclosed, but on the contrary, the invention is to cover all modification, equivalents, and alternatives falling within the spirit and scope of the invention as defined by the claims.

FIG. 1 illustrates a first preferred embodiment for an apparatus 10 for assembling a multifiber interconnection circuit where the multifiber interconnection circuit comprises at least one optical fiber disposed between a first cover member and a second cover member. The apparatus 10 comprises a transfer member 20, a receiving member 40, and a template 30. The transfer member 20 is preferably substantially rectangular and rigid, although it can be any shape or flexible. The transfer member 20 includes a support surface 22 configured to provide planar support to a material 40 arranged thereon to receive an elongated member, such as a fiber 100. The transfer member 20 can further include at least one alignment guide 24. Preferably, however, the transfer member 20 includes a plurality of alignment guides 24 extending from the support surface 22, such as cylindrical pegs or the like. It is further preferable that the alignment guides 24 are configured on the transfer member 20 such as to provide an indication of orientation for the circuit to be produced, such as the example illustrated, including three alignment guides 24 on one side of the transfer member and two alignment guides 24 on the opposing side.

The receiving member 40 of the apparatus 10 preferably comprises a flexible sheet, such as KAPTON®, or a printed circuit board (PCB). It is further preferable that one surface of the receiving member 40 comprises a substantially tacky surface 42. The tacky surface 42 of the receiving member 40 provides a surface for the fibers to be transferred to and held thereon, thereby forming the first cover member. Although described herein as preferably flexible, it should be understood that the receiving means 40 can be rigid, and furthermore may be made of any material suitable to receive fibers.

Figure 4:
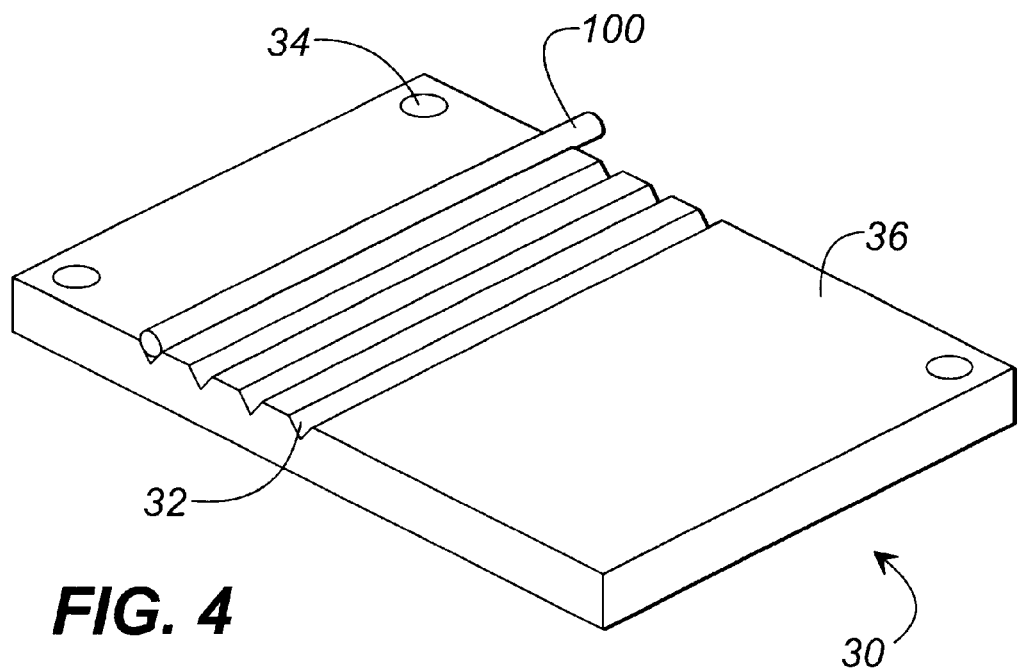
FIG. 4 is a cross-section perspective view of the template illustrated in FIG. 1 having grooves and a fiber disposed in a groove.

The apparatus 10 also includes a means, such as a template 30, for routing a fiber 100. The template 30 is preferably substantially rigid and rectangular in shape, and includes a first end 31 and a second end 33 and a planar application surface 36. Turning now to FIG. 4, illustrating a first preferred embodiment, the application surface 36 includes at least one means for routing at least one optical fiber 100, such as a passage or groove 32, but preferably a plurality thereof, each configured to accommodate a fiber 100 therein. The groove 32 has a depth recessed into the application surface 36 of the template 30 and is configured such that a fiber 100 disposed in the groove 32 is partially disposed above the plane of the application surface 36 adjacent the groove 32. The template 30 preferably further includes a means for receiving the alignment means, or an alignment recess 34. The alignment recess 34 is configured to receive the alignment guide 24 disposed on the transfer member 20 (shown in FIG. 2). It is preferable that the template 30 includes a plurality of alignment recesses 34 disposed thereon to engage the preferred plurality of alignment guides 24 disposed on the transfer member 20. As illustrated in FIG. 1, the configuration of alignment guides 24 and alignment recesses 34 on the transfer member 20 and template 30, respectively, can be used to provide an indication of orientation of the connection circuit to be produced, by including a differing number of alignment guides and recesses, 24 and 34, on opposing edges of the transfer member 20 and template 30. It should be understood that the example configuration illustrated to indicate alignment and orientation is not intended to be a limiting configuration.

Figure 2:
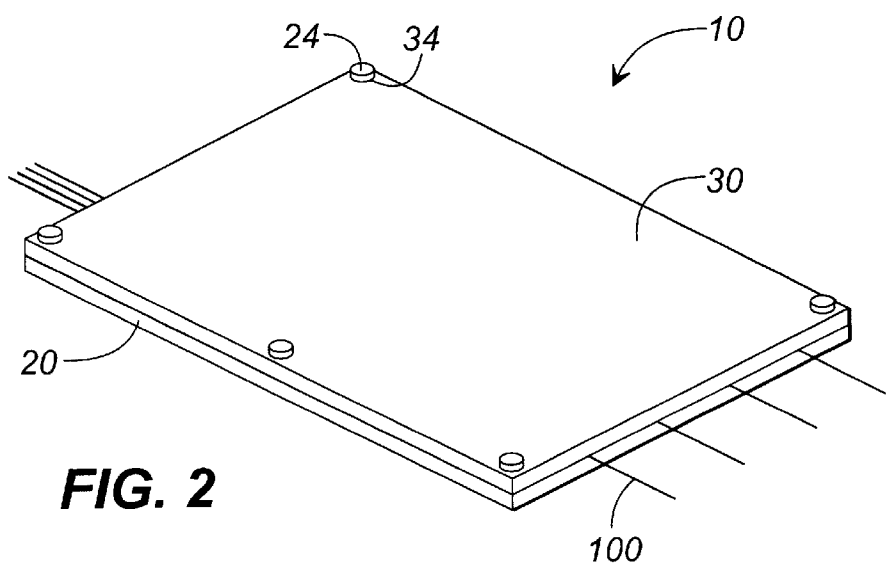
FIG. 2 is a perspective view of the apparatus for assembling a multifiber interconnection circuit transferring a fiber.
Figure 3:
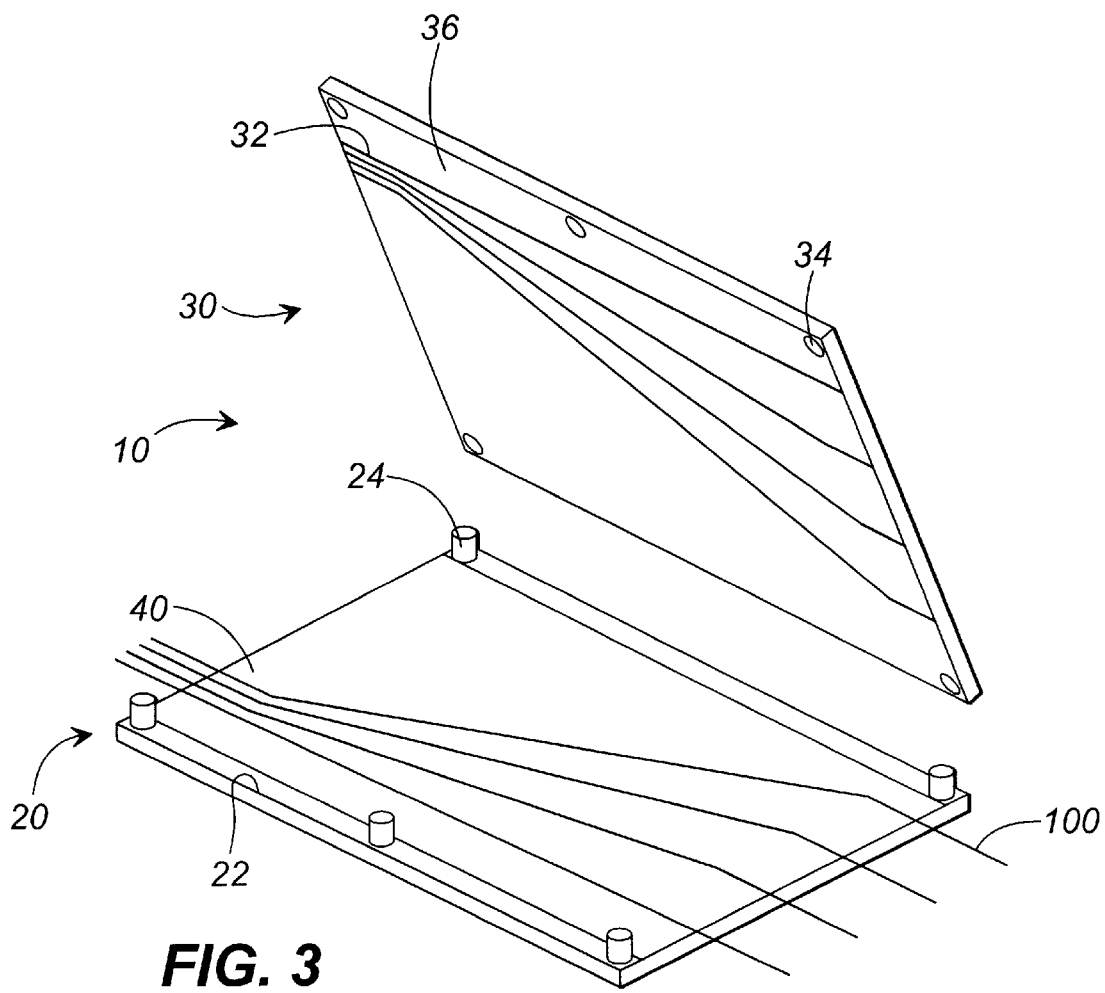
FIG. 3 is a perspective view of the apparatus for assembling a multifiber interconnection circuit after transferring a fiber.
Figure 5A:
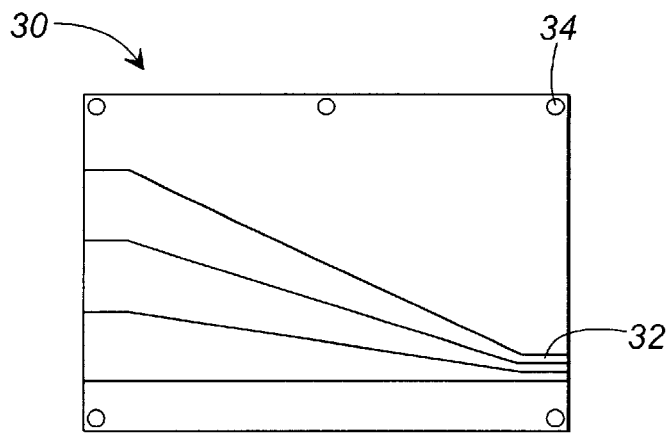
FIG. 5a is a plan view of one of a plurality of templates having grooves disposed in a predetermined configuration that can be used to create a cross-connection circuit.
Figure 5B:
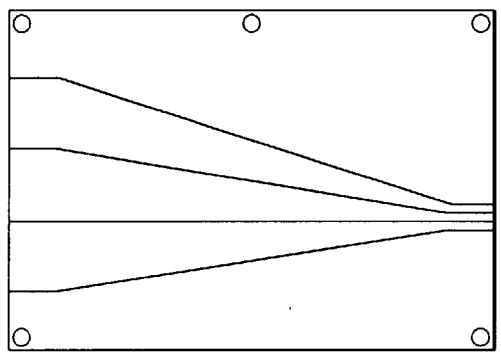
FIG. 5b is a plan view of one of a plurality of templates having grooves disposed in a predetermined configuration that can be used to create a cross-connection circuit.
Figure 5C:
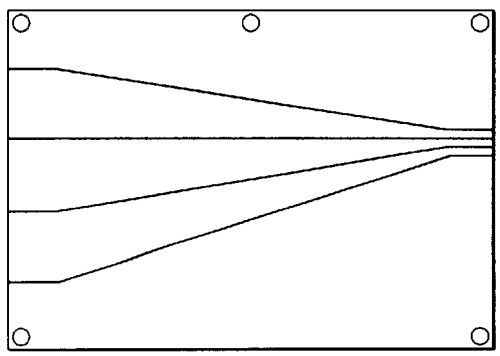
FIG. 5c is a plan view of one of a plurality of templates having grooves disposed in a predetermined configuration that can be used to create a cross-connection circuit.
Figure 5D:
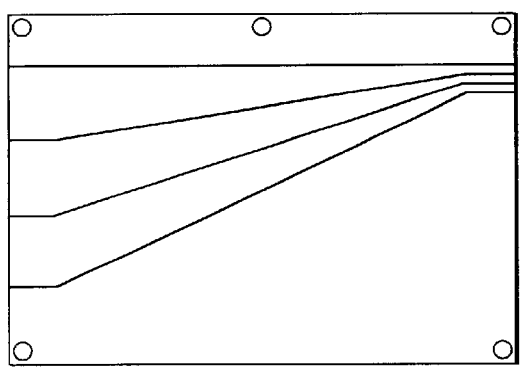
FIG. 5d is a plan view of one of a plurality of templates having grooves disposed in a predetermined configuration that can be used to create a cross-connection circuit.
Figure 5E:
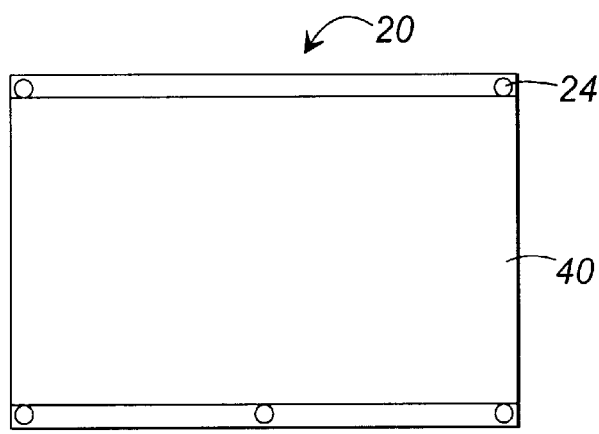
FIG. 5e is a plan view of a transfer member having a receiving member disposed thereon.
Figure 5F:
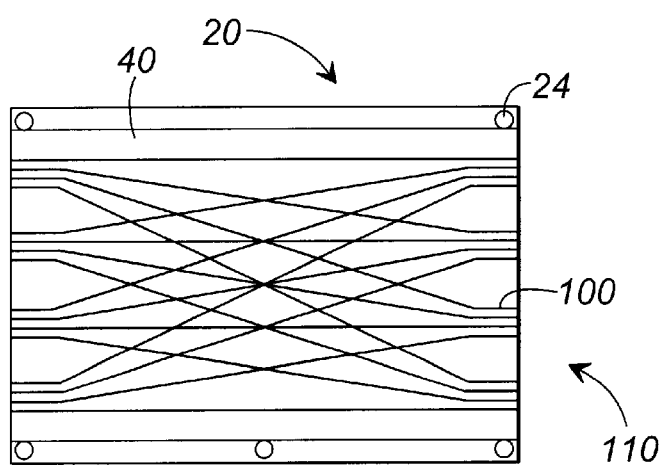
FIG. 5f is a plan view of a transfer member having a receiving member disposed thereon after fibers have been transferred from each of the templates illustrated in FIGS. 5a through 5d.

Looking now at FIGS. 1, 2 and 3, in consecutive order, illustrated is a method for manufacturing a multifiber interconnection circuit using the first preferred embodiment described above where the multifiber interconnection circuit includes at least one fiber 100 sandwiched between a first cover member and a second cover member. Specifically, illustrated and described in detail, is the production of a fan-out circuit, however, it should be understood that this same method may be used to produce a cross-connection circuit as well and, furthermore, may be applicable for the production of many other circuits. First, a template 30, having at least one groove 32 disposed in the application surface 36 is provided. Preferably, however, and as illustrated herein, a plurality of grooves 32 arranged in a predetermined configuration of the desired fan-out circuit to be produced are provided in the template 30. A receiving member 40 comprising the first of the first and second cover members to sandwich the fiber 100 to create the multifiber interconnection circuit, is provided on the support surface 22 of the transfer member 20. The receiving member 40 preferably has a tacky surface 42 facing upwardly and away from the transfer member 20. The fibers 100 to be used to make up the circuit are positioned in the grooves 32 of the template 30. It is preferable that the fibers 100 are held in the grooves 32 securely enough such that they remain in their positions in the grooves 32 while the template 30 is positioned on the transfer member 20. One approach for holding the fibers 100 in the grooves 32 of the template 30 can be to provide one or a plurality of vacuum induced suction points along the grooves 32, through which the suction would act to hold the fibers 100 in the grooves 32. Another approach for fixing the fibers 100 in the grooves 32 can be through the use of adhesive. Adhesive can be applied to the fibers 100 prior to positioning the fibers 100 in the grooves 32. Adhesive can be applied to the fibers 100, such as by spraying or dipping, prior to positioning the fibers 100 in the grooves 32, to hold the fibers 100 in position in the template 30. The adhesive that can be applied to the fibers 100 prior to being positioned on the template 30 should be less adhesive than the tacky surface 42 of the receiving member 40 to facilitate transfer of the fiber 100 from the groove 32 to the receiving member 40. Once the fibers 100 are positioned in the grooves 32 and the receiving member 40 is arranged on the transfer member 20, the template 30 is positioned on the transfer member 20, such that the receiving member 40 and the fibers 100 are disposed therebetween and the alignment recesses 34, disposed in the template 30, engage the alignment guides 24, extending from the support surface 22 of the transfer member 20. To effectuate the transfer of fibers 100 from the grooves 32 in the template 30 onto the receiving member 40, pressure can be applied to the template 30. Upon the fiber 100 being transferred onto the receiving member 40, the template 30 may be removed from its position atop the transfer member 20, shown in FIG. 3. The fibers 100 are now fixed to the tacky surface 42 of the receiving member 40. This process is repeated with the number of templates 30 necessary to form the desired circuit configuration. After all the desired fibers are applied to the receiving member, it is preferable that a second cover member (not shown) is disposed on top of the receiving member such as to sandwich the fibers 100 therebetween. The circuit 110 comprising the fibers 100 sandwiched between the receiving member 40 and the second cover member (not shown) can now be removed from the support surface 22 of the transfer member 20. The ends of the connecting circuit 110 can now be spliced and connected to other devices as needed or connectors 112 can be fixed to the free ends of the circuit 110. In another aspect of the present invention, a cross-connection circuit (shown in FIG. 5F) can be produced by using a plurality of templates 30, each having various predetermined configurations of grooves 32 (shown in FIGS. 5A–5D). Fibers 100 are placed in the grooves 32 disposed in each template 30 and transferred onto the receiving member 40 mounted on the transfer member 20 one template 30 at a time, thereby resulting in the cross-connection circuit 10 configuration shown in FIG. 5F. After the desired number of templates 30 are used to create the desired circuit fiber configuration, a second cover member (not shown) may be placed over the receiving member 40 such that the configuration of fibers 100 is sandwiched therebetween. The circuit 110 comprising the fibers 100 sandwiched between the receiving member 40 and the second cover member (not shown) may then be removed from the transfer member 20. Although four templates 50 are illustrated herein having specific configurations, it should be noted that as many or as few templates 50 may be used having any configuration to transfer fibers 100 to a receiving member 40. Additionally, it should be understood that any type of fibers can be used in the herein disclosed apparatus, such as glass fibers, jacketed fibers, buffered fibers, plastic fibers, etc.

Figure 4A:
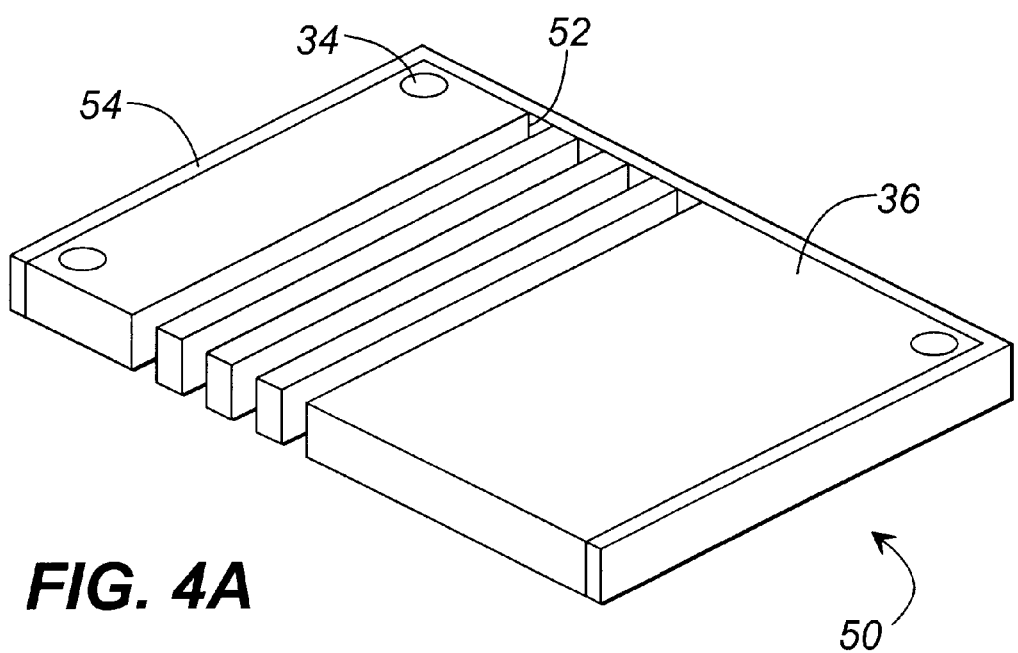
FIG. 4a is a cross-section perspective view of the template illustrated in FIG. 1 having channels disposed therein.

A second preferred embodiment includes a transfer member 20 and a receiving member 40, similar to those of the first embodiment described above. However, the template 50 (shown in FIG. 4A) includes at least one alignment recess 34 and at least one means for routing the elongated member from the first end 31 of the template 50 to the second end 33, such as a channel 52, configured to allow at least one fiber to pass therethrough, disposed completely through the template 50, and a template rim 54 disposed around a perimeter of the template 50 to hold the template 50 in one piece despite the channel 52 disposed through it. It is preferable that the template 50 includes a plurality of alignment recesses 34 (to engage the preferred plurality of alignment guides 24, as described above, thereby providing alignment and orientation) and a plurality of channels 52. Similar to the grooves 32 of the first preferred embodiment, the channels 52 can be arranged in various predetermined configurations to transfer fibers 100 onto a receiving member 40 to produce an interconnection circuit 110.

Figure 6A:
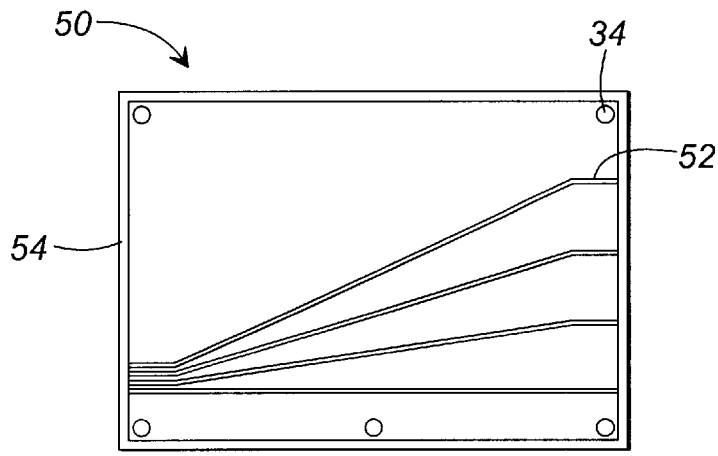
FIG. 6a is a plan view of one of a plurality of templates having channels as illustrated in FIG. 4a disposed in a predetermined configuration that can be used to create a cross-connection circuit.
Figure 6B:
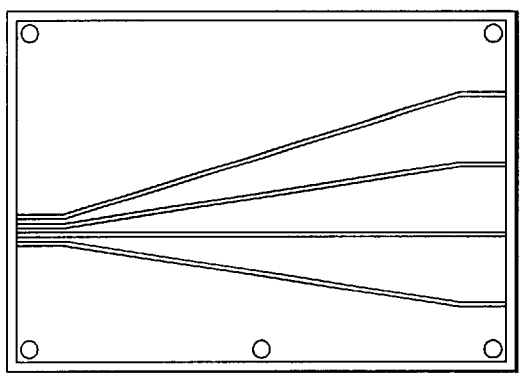
FIG. 6b is a plan view of one of a plurality of templates having channels disposed in a predetermined configuration that can be used to create a cross-connection circuit.
Figure 6C:
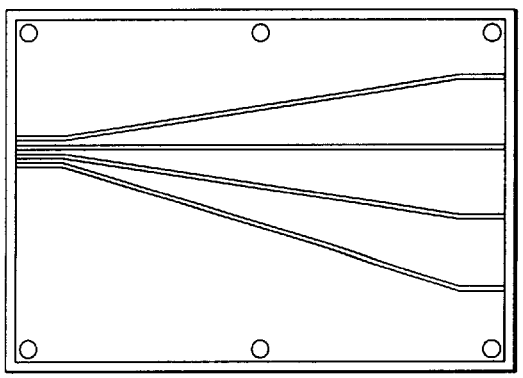
FIG. 6c is a plan view of one of a plurality of templates having channels disposed in a predetermined configuration that can be used to create a cross-connection circuit.
Figure 6D:
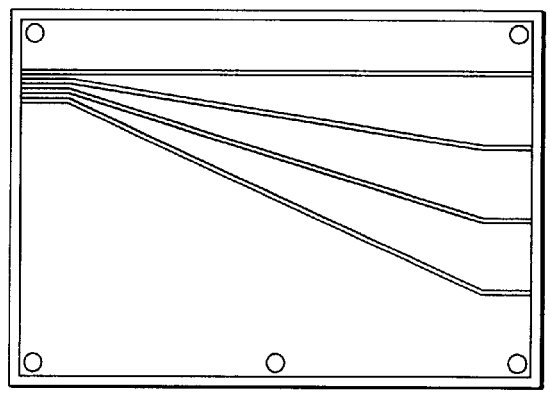
FIG. 6d is a plan view of one of a plurality of templates having channels disposed in a predetermined configuration that can be used to create a cross-connection circuit.
Figure 6E:
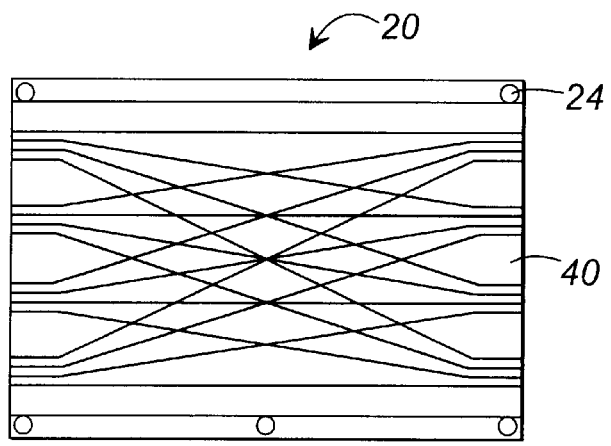
FIG. 6e is a plan view of a transfer member having a receiving member disposed thereon.
Figure 6F:
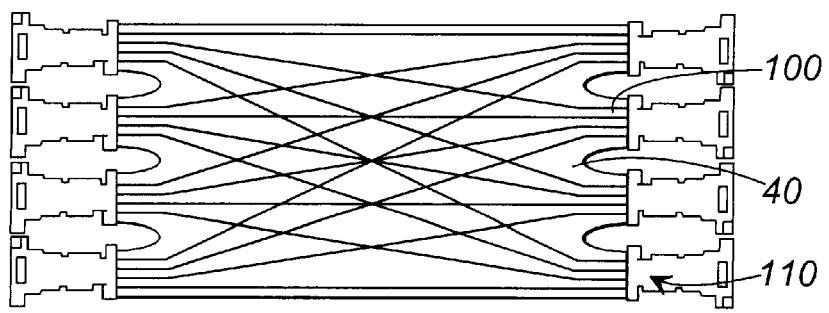
FIG. 6f is a plan view of a transfer member having a receiving member disposed thereon after fibers have been transferred from each of the templates illustrated in FIGS. 6a through 6d.

In the preferred method of use of the second preferred embodiment, at least one template 50 is provided. The template 50 includes a predetermined channel configuration. Similar to the preferred method of use of the first embodiment, a receiving member 40 is provided on the support surface 22 of a transfer member 20. The receiving member 40 provides a first cover member of a multifiber interconnection circuit to be produced and includes a tacky surface 42 facing upwardly and away from the transfer member 20. The template 50 is placed on the transfer member 20, again aligning the alignment recesses 34 of the template 50 with the alignment guides 24 of the transfer member 20 such that the receiving member 40 is disposed therebetween. A fiber 100 can then be passed through the channel 52 and onto the receiving member 40. To produce a cross-connection circuit, a plurality of templates 50 may be provided, each having various configurations of channels 52 (shown in FIGS. 6A–6D). Fibers 100 are passed through the channels 52 disposed in each template 50, one template at a time, thereby creating the desired fiber 100 configuration for a cross-connection circuit 110 (shown in FIG. 6F). After all of the desired fibers 100 are transferred to the receiving member 20, a second cover member (not shown) may be placed over the receiving member 40 such that the configuration of fibers 100 is sandwiched therebetween, thereby creating a circuit 110. The circuit 110 may then be removed from transfer member 20. Each can be ribbonized or re-ribbonized and connected to devices between which communication is desired. Although four templates 50 are illustrated herein having specific configurations, it should be noted that as many or as few templates 50 may be used having any configuration to transfer fibers 100 to a receiving member 40. Furthermore, although a planar configuration of the transfer member 20 and template 30 are illustrated and discussed above, it should be understood that other configurations are intended to be covered herein, such as a substantially cylindrical template that "rolls" the fibers onto a transfer member, for one example. Additionally, it should be understood that any type of fibers can be used in the herein disclosed apparatus, such as glass fibers, jacketed fibers, buffered fibers, plastic fibers, etc.

What is claimed is:

1. An apparatus for assembling a multifiber interconnection circuit having at least one elongated member disposed between a first cover member and a second cover member, said apparatus comprising:

a template, said template having a first end and a second end, said template including a means for routing one or more substantially elongated members from said first end of said template to said second end of said template;

a receiving member, said receiving member comprising a substantially tacky surface with which said receiving member receives the elongated member from said template; and a transfer member, said transfer member having a support surface configured to support said receiving member;

wherein one of said template and said transfer member includes an alignment guide, said alignment guide aligns said template with said transfer member to transfer said elongated member from said template to said receiving member disposed on said transfer member.

2. The apparatus for assembling a multifiber interconnection circuit of claim 1, wherein said multifiber interconnection circuit comprises an optical fiber connector.

3. The apparatus for assembling a multifiber interconnection circuit of claim 1, wherein said substantially elongated member comprises an optical fiber.

4. The apparatus for assembling a multifiber interconnection circuit of claim 1, wherein said template comprises a substantially rigid plate being substantially planar.

5. The apparatus for assembling a multifiber interconnection circuit of claim 1, wherein said template further comprises:
an application surface; and
a groove having a depth, said depth being recessed into said application surface, said depth determined by a thickness of the elongated member to be received such that a portion of the thickness of the elongated member to be received extends beyond a plane of the application surface immediately adjacent said groove.

6. The apparatus for assembling a multifiber interconnection circuit of claim 1, wherein said template further comprises:
a channel, said channel extending through said template, said channel configured to allow the elongated member to pass therethrough.

7. The apparatus for assembling a multifiber interconnection circuit of claim 6, wherein said template further comprises:
a template rim, said template rim disposed around a perimeter of said template, wherein said channel is not disposed in said template rim.

8. The apparatus for assembling a multifiber interconnection circuit of claim 1, wherein said template further comprises:
an alignment recess, said alignment recess arranged and configured to receive said alignment guide.

9. The apparatus for assembling a multifiber interconnection circuit of claim 1, wherein said template is substantially flexible.

10. The apparatus for assembling a multifiber interconnection circuit of claim 1, wherein said transfer member comprises a plate being substantially rigid and substantially planar.

11. The apparatus for assembling a multifiber interconnection circuit of claim 1, wherein said transfer member further comprises the alignment guide.

12. The apparatus for assembling a multifiber interconnection circuit of claim 1, wherein said transfer member is substantially flexible.

13. The apparatus for assembling a multifiber interconnection circuit of claim 1, wherein said receiving member comprises said first cover member of said circuit.

14. The apparatus for assembling a multifiber interconnection circuit of claim 1, wherein said receiving member comprises KAPTON®.

15. The apparatus for assembling a multifiber interconnection circuit of claim 1, wherein said receiving member is substantially rigid.

16. The apparatus for assembling a multifiber interconnection circuit of claim 1, wherein said receiving member is substantially flexible.

17. A method for assembling a multifiber interconnection circuit having at least one elongated member disposed between a first cover member and a second cover member, said method comprising the steps of:
providing a passage in a template, said passage arranged in a predetermined configuration;
arranging an elongated member in said passage;
providing a receiving member on a transfer plate;
placing said template on said transfer plate such that the elongated member is adjacent said receiving member; and
transferring the elongated member from the template to the receiving member.

18. The method of claim 17, further comprising the steps of:
providing an alignment member on one of said transfer plate and said template; and
providing an alignment recess on the other of said transfer plate and said template.

19. The method of claim 18, wherein said step of placing said template on said transfer plate further comprises the step of:
engaging said alignment member and said alignment recess to align said template with said transfer plate.

20. The method of claim 17, wherein said step of arranging an elongated member in said passage includes:
applying a substantially tacky substance to the elongated member, thereby allowing the elongated member to remain arranged in said passage of said template.

21. A method for assembling a multifiber interconnection circuit having at least one elongated member disposed between a first cover member and a second cover member, said method comprising the steps of:
providing a channel in a template, said channel arranged in a predetermined configuration;
providing a receiving member on a transfer plate;
placing said template on said transfer plate; and
passing an elongated member through said channel in said template to said receiving member.

22. The method of claim 21, further comprising the steps of:
providing an alignment member on one of said transfer plate and said template; and
providing an alignment recess on the other of said transfer plate and said template.

23. The method of claim 22, wherein said step of placing said template on said transfer plate further comprises the step of:
engaging said alignment member and said alignment recess to align said template with said transfer plate.

* * * * *